United States Patent [19]

Deutsch

[11] 3,862,372

[45] Jan. 21, 1975

[54] BRANCH EXCHANGE INCLUDING ELECTRONIC TIMER

[75] Inventor: Herman Deutsch, Raleigh, N.C.

[73] Assignee: Tele-Resource, Inc., White Plains, N.Y.

[22] Filed: July 2, 1973

[21] Appl. No.: 375,459

Related U.S. Application Data

[63] Continuation-in-part of Ser. No. 291,960, Sept. 25, 1972.

[52] U.S. Cl. .......... 179/15 AT, 179/18 J, 340/172.5

[51] Int. Cl. .......... H04m 3/00

[58] Field of Search .......... 179/15 AT, 15 A, 15 AL, 179/15 AQ, 18 ES, 18 AD, 18 HA, 18 J; 340/172.5

[56] References Cited

UNITED STATES PATENTS

| | | | |
|---|---|---|---|
| 3,526,878 | 9/1970 | Bennett et al. | 340/172.5 |
| 3,599,160 | 8/1971 | Nestle et al. | 340/172.5 |
| 3,757,053 | 9/1973 | Pell et al. | 179/15 AL |
| 3,764,989 | 10/1973 | McClellan | 179/15 A X |
| 3,787,633 | 1/1974 | Busch | 179/15 AT |

*Primary Examiner*—Joseph F. Ruggiero
*Attorney, Agent, or Firm*—Hopgood, Calimafde, Kalil, Blaustein & Lieberman

[57] ABSTRACT

An electronic timer includes a recirculating memory in which binary timer numbers can be recorded and a counter for incrementing the timer number when required as it recirculates. A comparator receives the output of the timer number and a time base signal of varying polarity. A gate means responsive to the output of the comparator causes the counter to increase the timer number each time the phase of the time base signal changes. When the timer number reaches a predetermined magnitude, a time elapse gate so indicates. Various time base signals having different pulse rates may be selected, depending upon the interval to be measured. This timer may be incorporated in a telephony exchange in which the timer memory is part of the connection memory.

2 Claims, 10 Drawing Figures

BRANCH EXCHANGE INCLUDING ELECTRONIC TIMER

RELATED APPLICATIONS

This application is a continuation-in-part of application Ser. No. 291,960, filed on Sept. 25, 1972, and entitled "Time Division Multiplex Branch Exchange." Other aspects of the telephony system disclosed herein are claimed in the following copending applications: "Automatic Branch Exchange Using Time Division Switching," Ser. No. 375,741, filed on July 2, 1973; "Temporary Memory for Time Division Multiplex Telephony System Exchanges and Method of Using Same," Ser. No. 375,790, filed on July 2, 1973; and "Telephone Exchange Having Permanent Memory for Operating Instructions," Ser. No. 375,740, filed July 2, 1973.

BACKGROUND OF THE INVENTION

This invention relates to an electronic timer, and more particularly to a new and improved timer in which time is measured by the increasing magnitude of a binary timer number incremented by a time base signal of changing polarity. Because of its unique structure, this timer is particularly suitable for use in a time division private branch exchange for a telephony system.

It is conventional to count time by incrementing a recorded number at predetermined intervals. However, conventional timers are readily capable of counting several intervals only if all these intervals begin at the same time.

There are situations in which it is desired to count numerous intervals of different lengths beginning at different times. That is, for example, desired in a telephone branch exchange in which it might be necessary to time various calls that have been placed on hold or to limit the time of connection to a dial register. Different conditions of this nature require different length intervals and begin at random times. The large number of separate conventional timers required for this arrangement is costly and unduly complex.

Accordingly, there is an established need for a timer that can time simultaneously measure intervals of different lengths and beginning at different times.

SUMMARY OF THE INVENTION

The present invention comprises a recirculating memory in which binary timer numbers can be recorded. A counter means selectively increments each timer number, and a comparator compares the low order bit to the phase of a selected time base signal. Each time the polarity of the signal changes, the timer number is increased. When it reaches a predetermined magnitude, it indicates that a time interval has elapsed.

A time base signal having the desired pulse rate can be chosen by a selector in accordance with the interval to be measured.

This timer is particularly suitable for incorporation in a telephony branch exchange having a recirculating temporary memory containing address information for connection purposes. The memory of the timer can then be made part of the connection memory. In a time division exchange, the memory may include one set of binary storage elements per time slot, and each slot can then be timed independently at a rate established by selecting the proper time base signal.

BRIEF DESCRIPTION OF THE DRAWINGS

The above and other objects, features and advantages of the present invention are realized in a specific illustrative embodiment thereof, discussed in detail hereinbelow in conjunction with the accompanying drawings in which.

DESCRIPTION OF THE PREFERRED EMBODIMENT

The Stations

Figure 1:
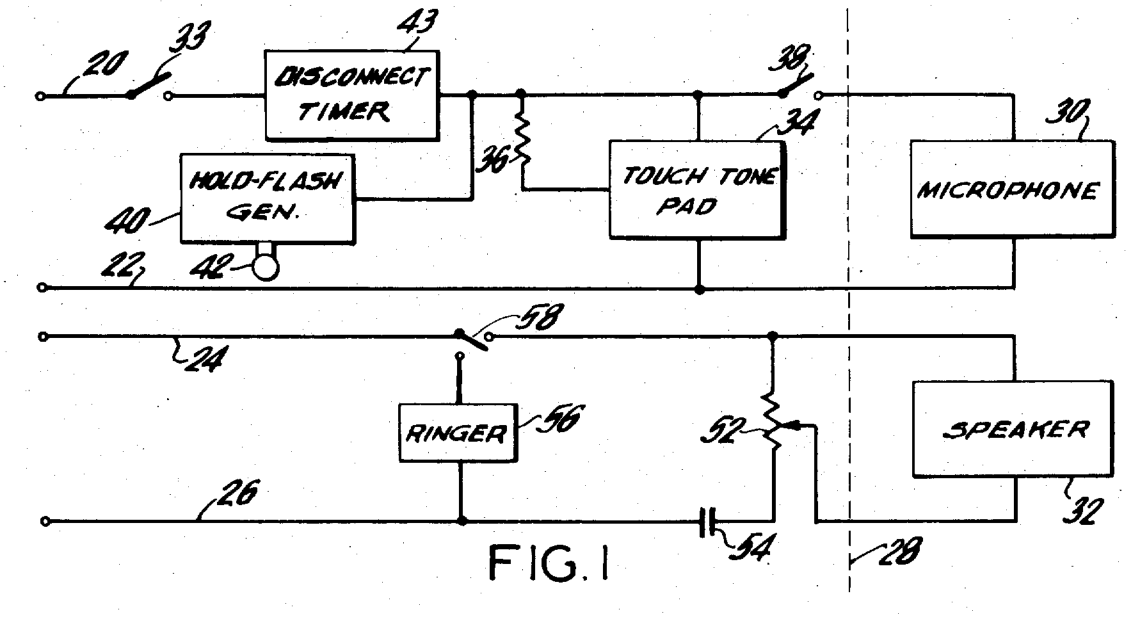
FIG. 1 shows the circuitry contained within an individual station of a telephony system.

Each station used in the telephony system of this invention contains a printed circuit shown in FIG. 1 and is connected to the private branch exchange of the system by four conductors, a pair of transmitting conductors 20 and 22 and a pair of receiving conductors 24 and 26. These conductors 20, 22, 24 and 26 can be individual copper wires, or they can be formed by coaxial cables, each of which provides two conductors. The components of the station contained in the handset are shown to the right of the broken line 28. They include a carbon microphone 30 connected between the transmitting conductors 20 and 22 and a speaker 32 connected between the receiving conductors 24 and 26.

When the handset of a station is lifted, a hook switch 33 closes. This provides an indication that the station has gone off-hook by allowing current to flow through the transmitting wire pair 20, 22. There is a nonvarying potential drop within a station when the handset is off-hook and there is no audio input to the microphone 30.

The station contains a conventional Touch Tone pad 34 by which tone signals can be generated and sent to the PBX to indicate a desired interconnection with another station or trunk line through a common time slot. A rotary converter may be included in the PBX if the Touch Tone signal can not be processed by the external equipment to which the system is connected. The pad 34 is biased through a resistor 36. The microphone 30 is disconnected by a switch 38 when a key of the pad 34 is depressed. The station contains a hold-flash generator 40 connected to the conductor 20 by which a signal is sent to the PBX to indicate that a call is to be placed on hold. The hold-flash generator 40 is a solid state pulse generator that causes the transmit path through the wires 20 and 22 to be opened for a short predetermined interval of about 100 milliseconds each time a hold key 42 is depressed. This signal is used to indicate that a call is to be placed on hold. The pulse generator 40 and the button 42 could be eliminated and the hold signal could be sent manually by momentarily closing the hook switch 33, but the duration of the pulse is then not constant and the danger of an inadvertent disconnection arises. A disconnect timer 43 insures that the minimum on-hook interval exceeds the duration of a pulse generated by the hold-flash generator 42. This insures discrimination between hold and on-hook signals.

The receive path 24, 26 includes a hook switch 58 on the wire 24 similar to the hook switch 33 in the transmitted path 20, 22. A potentiometer 52 is provided for adjustment of the speaker volume level. A blocking capacitor 54 serves as a high pass filter to block AC hum and DC signals. When the station is on-hook, an electronic ringer 56 is connected across the receive pair 24, 26 by the double-throw switch 58. The ringing current to the station thus bypasses the speaker 32, potentiometer 52, and blocking capacitor 54. The ringer 56 is actuated by a 12 volt potential placed across the receive path 24, 26. When the hand set is lifted, the switch 58 disconnects the ringer 56 and reconnects the speaker 32.

The aspects of the stations of this telephony system not illustrated in FIG. 1 and described above are of conventional construction.

The Station Operating and Anti-Sidetone Circuits

Figure 2:
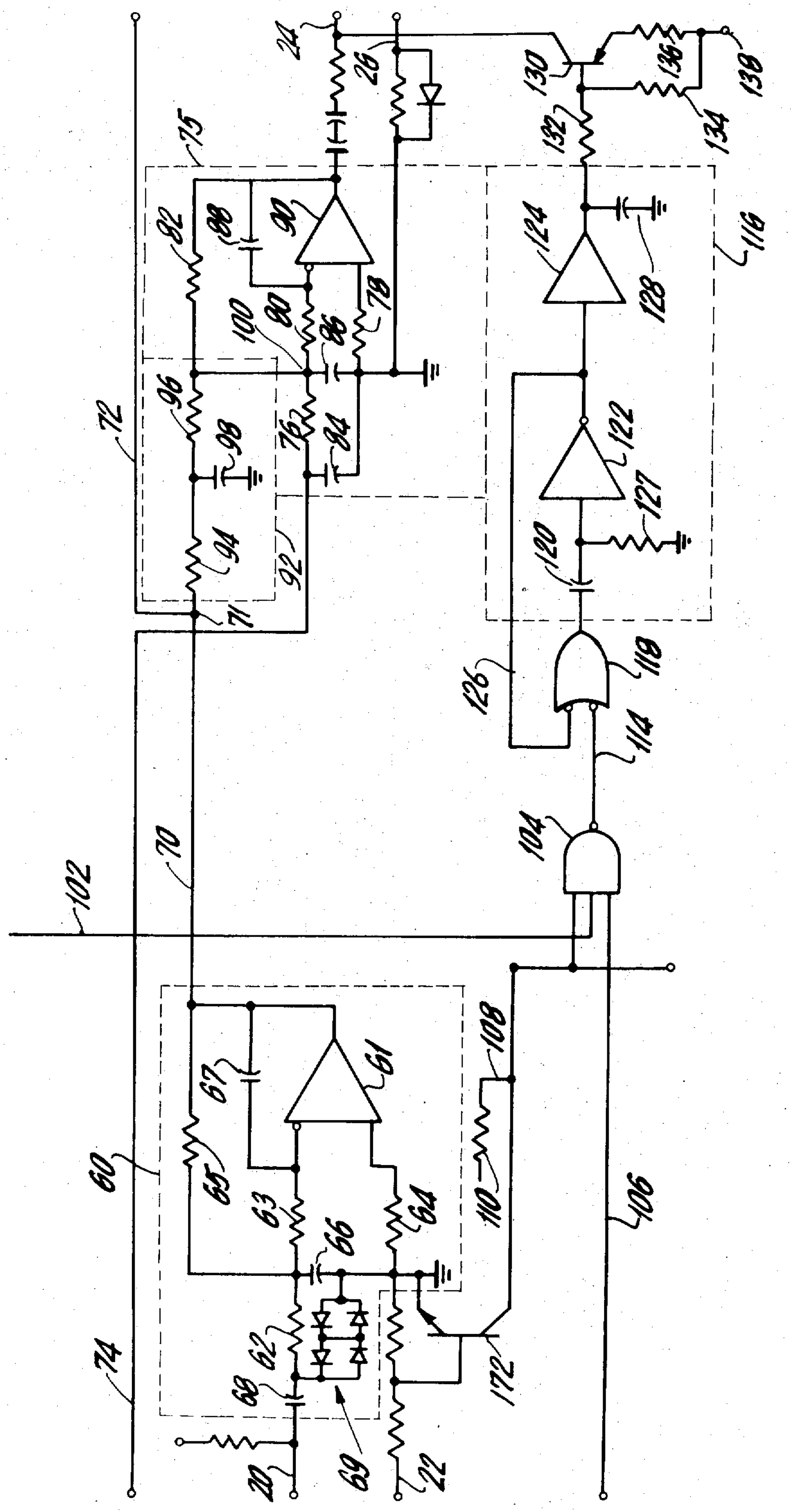
FIG. 2 shows the station operating and anti-sidetone circuits of the system.

The output of each pair of transmitting conductors 20 and 22 is supplied to an active filter network 60, an example of which is shown in FIG. 2. Each network 60 includes a transmitting amplifier 61, a plurality of resistors 62, 63, 64 and 65, a plurality of capacitors 66, 67 and 68, and a limiter in the form of a diode bridge 69. The function of the network 60 is to shape the output of the station and to limit its band width and amplitude. The shaped signal from the network 60 is supplied by a lead 70 to a junction 71, from which it is carried by a lead 72 to an input gate of the time division switch (described in detail below) for distribution, within a selected time slot, to other stations or to exterior trunk lines.

The gated audio signal from the input gates of the time division switch which is to be supplied to the receiving wires 24 and 26 of FIG. 1 is fed to the lead 74 of the circuit of FIG. 2. This signal is inverted with respect to the signal in line 72 by an odd number of upstream summing amplifiers. It is processed by a filter network 75 including a plurality of resistors 76, 78, 80 and 82, a plurality of capacitors 84, 86 and 88, and a receiving amplifier 90. The resistor 76 and the capacitor 84 produce a phase shift of the inverted signal. The phase of the signal from the junction 71 is shifted by a network 92 consisting of two resistors 94 and 96 arranged in series and a capacitor 98 connected to the lead joining the resistors 94 and 96 and connected to ground. However, the signal from the junction 71 is not inverted.

The input signal from the time division switch supplied through the lead 74 contains the audio output signal from the station to which the receiving wires 24 and 26 (FIG. 1) are connected as well as the audio outputs of other stations involved in the same conversation. An anti-sidetone means, including the network 92, is provided for preventing that station from receiving its own signal at full strength. Accordingly, the inverted signal from the junction 71 is added to the gated audio input signal at a junction 100 of the amplifier 90. Since the phase shifts of these signals are equal but only one signal is inverted, the signals are 180° out of phase. If the signal from the junction 71 were of the same amplitude as the input from the lead 74 which originate: from the receiving station connected to the conductors 24 and 26, it would completely cancel the signal from the lead 74. However, listeners generally prefer some residual sidetone, and therefore, it is preferable to provide a signal from the junction 71 that attenuates the sidetone to give a suppression of approximately 8 db.

Ring pulses are supplied during ringing period occurring at predetermined intervals by a line 102 to each of the circuits of FIG. 2, there being one such circuit for each station. Each line 102 is connected to an AND gate 104. A second input to the AND gate 104 is supplied by a line 106. Each line 106 is connected to only one circuit of the type shown in FIG. 2, and it carries a pulse only during a time slot assigned to a call in which the station is participating. A third input to AND gate 104 is derived from a lead 108 connected through a resistor 110 to a +5 volt source. The lead 108 is also connected to ground through a transistor 172. This transistor 172 is forward biased by signals carried by the transmitting conductor 22. Thus, when the station associated with the circuit of FIG. 2 is off-hook, the signal transmitted by the lead 108 is grounded through the transistor 172 and not supplied to the AND gate 104.

The AND gate 104 supplies output pulses through a lead 114 only if signals are supplied simultaneously through its three leads 102, 106 and 108. Thus, the ring pulse will arrive at lead 114 only if the station is on-hook (lead 108) and a signal indicating that the station is to be rung is present (lead 106). If the ring pulse is intended for a different station, it will not arrive during the time slot defined by the pulses supplied through lead 106.

The output of the AND gate 104 is supplied by the lead 114 to a pulse stretcher 116 which includes an AND gate 118, a capacitor 120, an inverter 122, and a voltage driver 124 arranged in series. The stretcher 116 is connected to ground by a resistor 127 and a capacitor 128. Part of the output of the inverter 122 is supplied as feedback to the AND gate 118 through a lead 126.

The output of the stretcher 116 is supplied to the base of a transistor 130 which is biased by three resistors 132, 134, and 136. When stretched ring pulses are applied to the transistor 130, they close a path from a +12 volt input terminal 138 to the receiving conductor 24, thus actuating the electronic ringer 56 in accordance with the arrival of these pulses.

The circuit shown in FIG. 2 may readily be placed on a removable circuit card. Each card may contain the circuitry for one or more stations. The cards are centrally located within the exchange. The capacity of an exchange can be expanded by adding cards, and repairs can be made by replacing a defective card and transporting it to a remote repair facility. The need for on sight service is thus minimized.

The Input Gates

Figure 3:
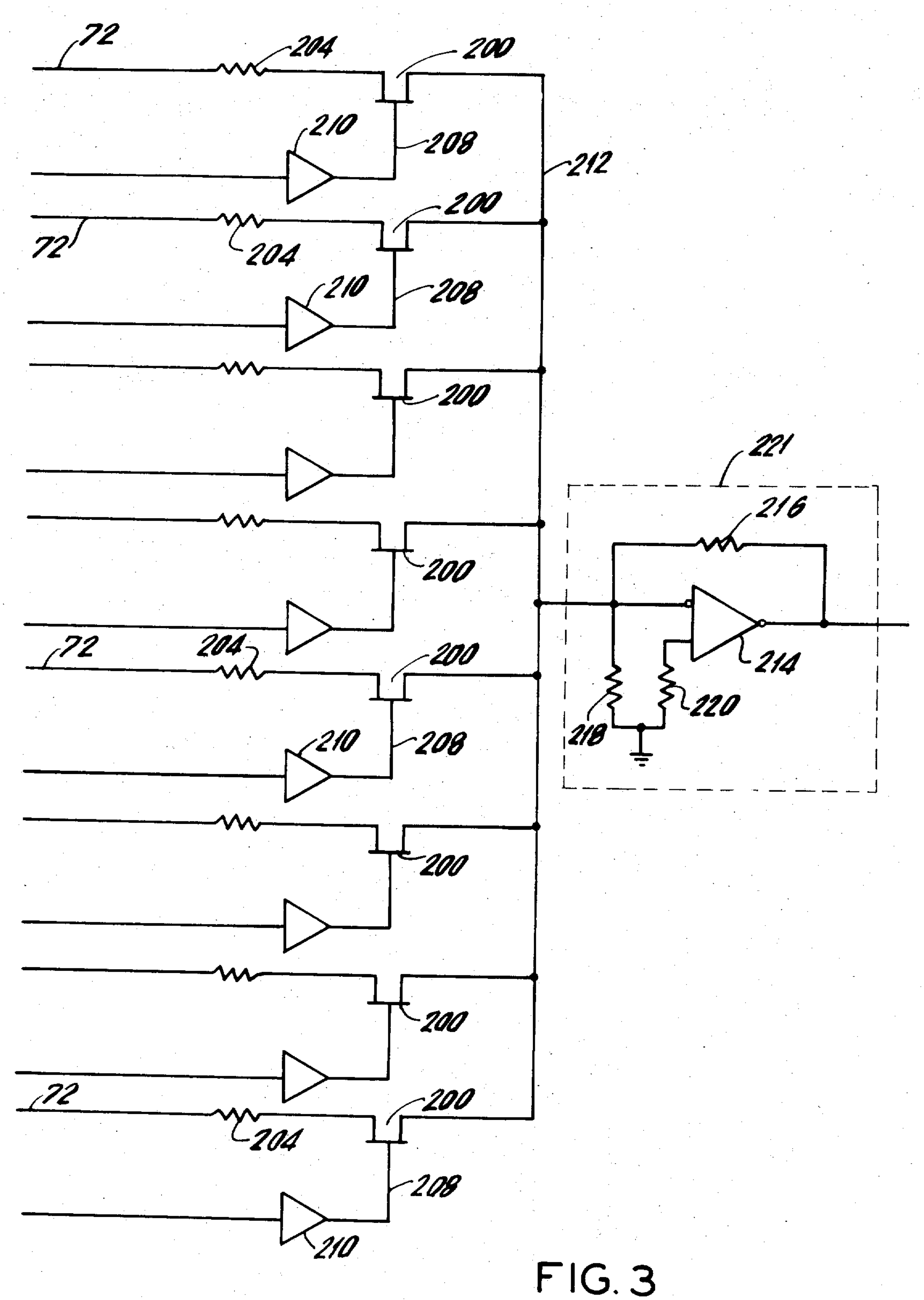
FIG. 3 shows a plurality of input gates used to selectively connect the stations of FIG. 1 to the speech highway of the system.

FIG. 3 shows a block of eight input gates 200, each of which receives an audio input from one station. This is a shaped and limited input supplied by the lead 72 of one of the circuits shown in FIG. 2, there being one such circuit for each station. The outputs of the gates 200 are supplied to a summing means described below.

Before reaching a gate 200, the signal passes through a summing resistor 204 which is connected to lead 72. The gate 200 is a field effect transistor (FET) which is closed to permit the audio signal carried by the lead 72 (FIG. 2) to be fed to the summing means of the exchange when a control pulse is applied by a line 208. Before reaching the FET gate 200, the control pulse is converted to a predetermined level by a level converter 210. The control pulse is supplied through the line 208 at a predetermined frequency at which it is desired to sample the audio signal from the station. The closing and opening of an input gate 200 defines a time slot which recurs at a predetermined frequency. The pulses supplied to the lines 208 to operate the input gates 200 are of the same frequency and duration as the pulses supplied to the lines 106. In one system constructed in accordance with the invention, each gate 200 is operated by gate control pulses through the appropriate line 208 at a frequency of 12.5 KHz. A group of gates 200 are connected to supply their respective outputs to a common lead 212 and then to a high frequency amplifier 214 which is part of the summing means. Although a block of eight gates connected to a high frequency amplifier 214 is shown in FIG. 3, the number of gates in a block may, of course, be varied. In one system constructed in accordance with this description, 16 gates 200 are connected to each high frequency amplifier 214, and 13 high frequency amplifiers 214 are connected to the downstream portion summing means (shown in FIG. 4 and described below).

The high frequency amplifier 214 is connected in parallel with a feedback resistor 216 and a second input is provided through two resistors 218 and 220 which are connected to ground. The gain of the amplifier 214 is determined by the values of the summing resistor 204 and the feedback resistor 216. These components all form the upstream portion 221 of the summing means 221. The downstream portion of the summing means is shown in FIG. 4.

The Summing Means and Output Gates

Figure 4:
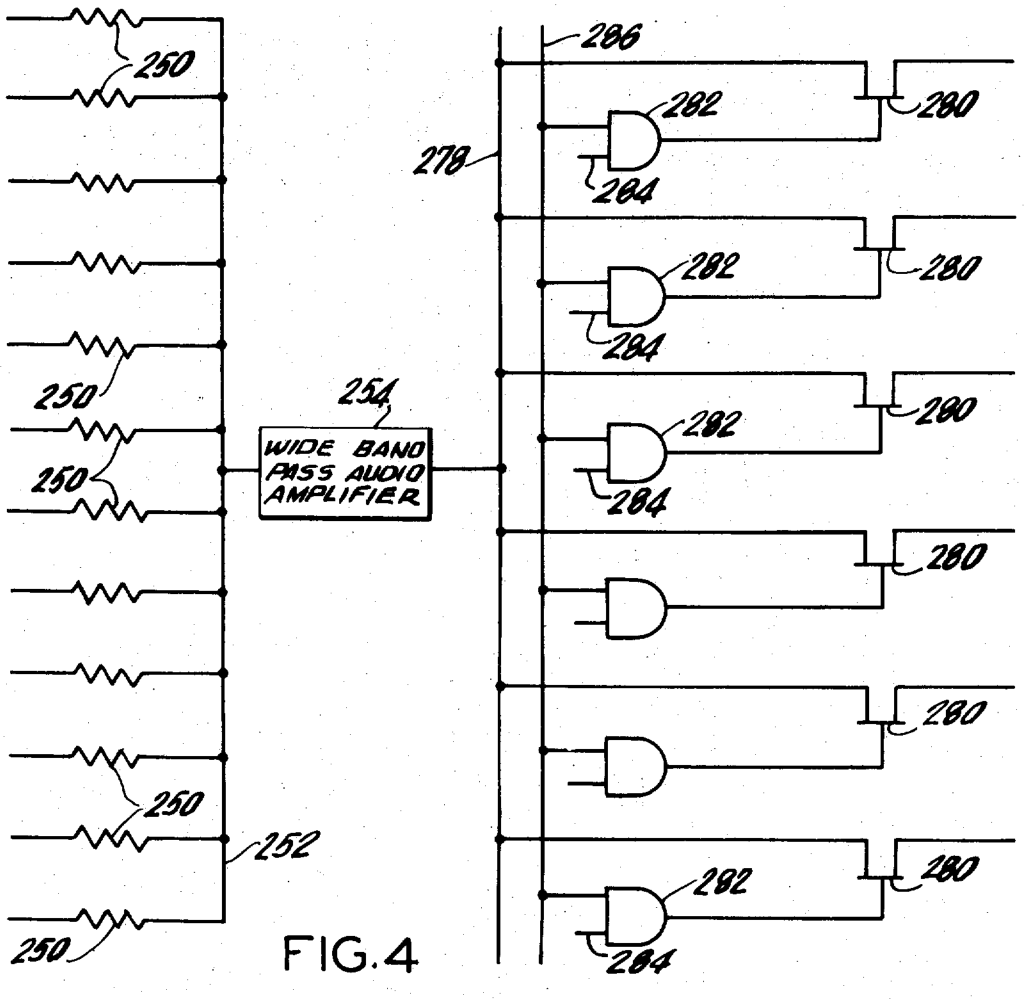
FIG. 4 shows the speech highway and output gates of the system.

FIG. 4 shows a further summing means in which a plurality of summing resistors 250 are arranged in parallel. Each of the resistors 250 receives the output of one of the amplifiers 214. The signals from the resistors 250 are combined on a common lead 252 and fed to a wide band-high slew rate amplifier 254 (also part of the summing means) which produces a composite signal containing information relating all time slots, i.e., all conversations taking place within the system. In one system that has been constructed in accordance with the invention, 32 time slots were used, 32 being an even binary number. Since each time slot was sampled at a rate of 12.5 KHz, the required band pass of the amplifier is 400 KHz. This is well within the capabilities of commonly available 500 KHz wide band amplifiers. The output of the main wideband amplifier 254 of the summing means is supplied via a common audio buss 278 to a plurality of output gates 280, each gate being an FET. Although only six output gates 280 are shown in FIG. 4, there is one such gate for each station in the system. Some gates 280 are associated with exterior trunk lines. A four-to-two wire adapter is then, generally, required.

The function of the summing means is thus to combine inputs consisting of energy produced during each selected time slot which recurs at a predetermined frequency and produce an output in accordance with the sum of these inputs. This is supplied to receiving conductors connected to the stations and exterior trunk lines that are participating in a particular call. There will, of course, generally be at least one station participating in each call. Conference calls can be arranged by interconnecting all participating stations and trunk lines in a single time slot.

The output gates 280 are closed by enabling pulses from a plurality of AND gates 282, there being one AND gate 282 for each output gate 280. These enabling pulses occur at the rate of one of each time slot. The output gate 280 associated with a particular station is rendered conductive only during the recurring time slot assigned to a call in which that station is participating. If the aforementioned system parameters are used, the enabling pulses occur at a frequency of 400KHz. They are, however, of shorter duration that the gate control pulses of the same frequency used to close and open the input gates 280 which define the time slots. This shorter duration causes the leading and trailing edges of the sample within each time slot to be trimmed, thus improving the quality of the signal. The means for trimming the samples is the AND gates 282.

The operation of the AND gates 282 takes place as follows. When a gate control pulse is supplied through one of the lines 208 to close an input gate 200 of a particular station, a pulse of the same duration is simultaneously supplied through a line 284 to the AND gate 282 which is associated with the output gate 280 of that same station. Each AND gate 282 also receives, through a common lead 286 connected to a second input terminal, a continuous series of trimming pulses which are of shorter duration than the pulses supplied through the leads 284. There is one trimming pulse supplied through the line 286 for each possible time slot. Since the AND gates 282 enable the output gates 280, the output gates are closed each time a pulse arrives through the corresponding line 284, but only for the duration of a trimming pulse.

The output gates 280 and their associated circuitry are, like the circuitry of FIGS. 2 and 3, of integrated circuit construction. The input and output gates 200 and 280 as well as the receiving and transmitting amplifiers 90 and 61 can be placed on circuit cards located at the PBX, remote from the individual stations which are distributed over an area such as an office.

The Structure of the Supervision & Control Circuitry

Figure 5:
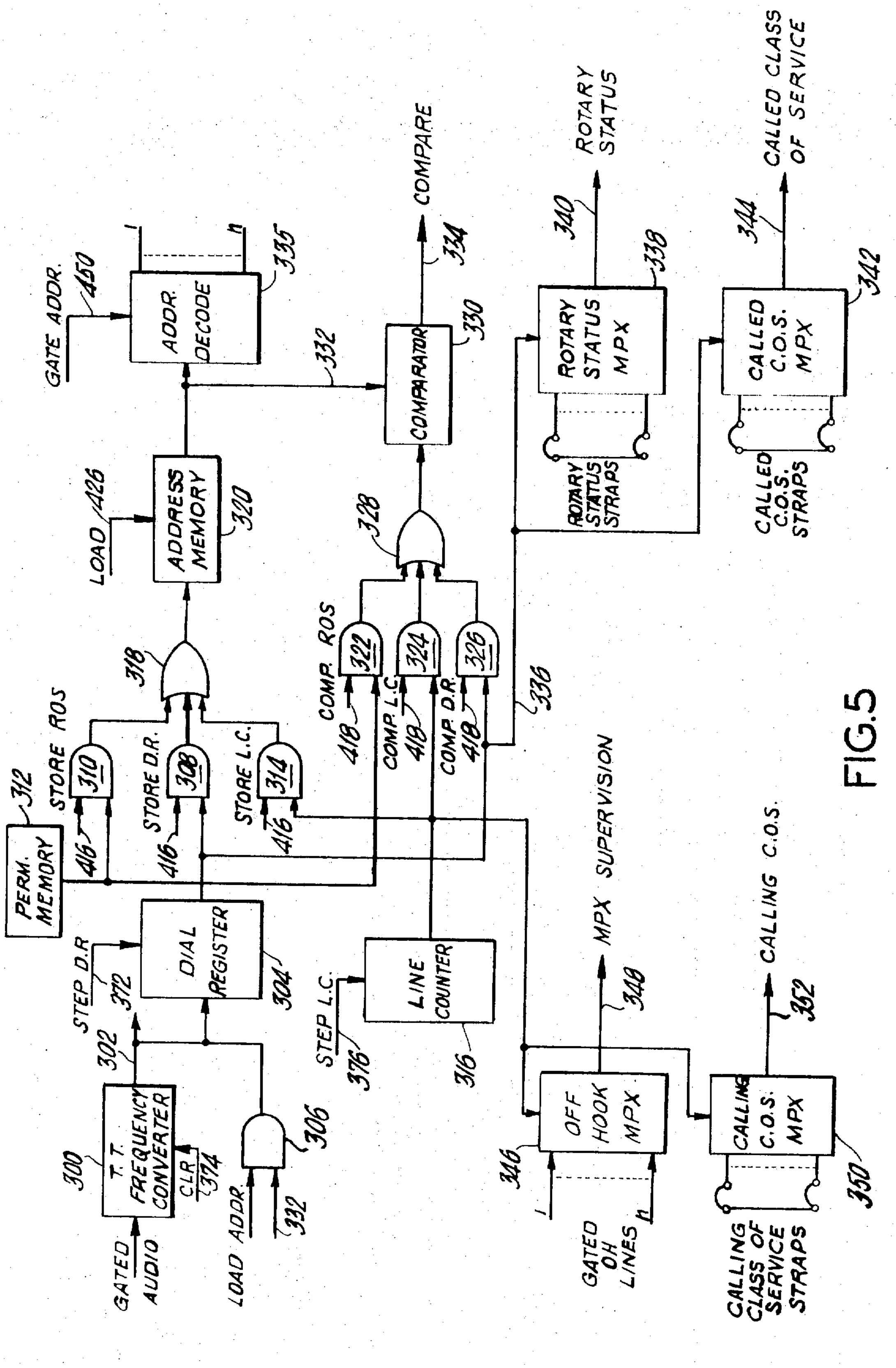
FIG. 5 shows the data flow portion of the supervision and control circuitry of the system.

FIG. 5 shows the data flow circuitry of the apparatus. It includes a frequency converter 300 which receives frequency combination signals from the touch tone pad 34 (FIG. 1) and converts them to corresponding binary signals which are supplied by a line 302 to a dial register 304. There may be more than one dial register if desired, but only one is shown here for illustrative purposes. The term "line" as used throughout this description may refer to a single wire or to a bundle of wires as may be necessary to conventionally communicate coded information in the form in which it is available.

Also supplied to the dial register 304 is the output of an AND gate 306, the function of which is to supply to the dial register 304 a specific address taken from a temporary memory formed by constantly recirculating shift registers and described below with reference to FIG. 10. This address may be referred to as an equipment address and is associated with a specific piece of equipment in the system, such as a station, that can be connected to other such equipment by the time division switch (FIGS. 3 and 4). The output of the dial register 304 is supplied to an AND gate 308. A parallel AND gate 310 is supplied with instructions from a permanent memory 312, and another parallel AND gate 314 is supplied with the output of a line counter 316 which accesses successive equipment addresses. The outputs of the AND gate 308, 310 and 314 are supplied to a common OR gate 318, the output of which is supplied to an address memory 320. This address memory 320 consists of a group of shift registers that form an address portion of the temporary memory.

Similar commands from the permanent memory 312, the line counter 316, and the dial register 304 are supplied to another group of parallel AND gates 322, 324, and 326 respectively, the outputs of which are supplied to a common OR gate 328 and then to a comparator 330. A second input to the comparator 330 is supplied by a line 332 from the output of the address memory 320. The comparator 330 produces an output on a line 334 if the result of the comparison is affirmative. The output of the address memory 320 in addition to being used in the comparator 330 is supplied to an address decoder 335 and then to the time division switch to gate the audio outputs via AND gates 282 on lines 284 (FIG. 4) and the inputs to the amplifier 210 (FIG. 3).

The output of the dial register 304 is also supplied by a line 336 to a rotary status multiplexer 338. This multiplexer is connected by discrete hard-wired lines (strap positions), each of which is uniquely assigned to a particular trunk or other such equipment address position, to provide an output on a line 340 indicating whether the station is wired for rotary status, i.e., automatic switching of incoming calls to another station having the next successive number in the event of a busy condition. Rotary capability is also used to permit trunk line hunting.

The output of the dial register 304 on the line 336 is also supplied to a called class-of-service multiplexer 342 which indicates, via discrete hardwired lines the called class-of-service of the particular equipment address by an output on a line 344. A class-of-service may be defined as a group of restrictions on the use that may be made of the station or other equipment having a particular equipment address. "Called" class-of-service refers to restrictions applied to calls received by that station. For instance, a station may be prevented from receiving incoming calls.

The output of the line counter 316 is also supplied to a calling class-of-service multiplexer 350 which is in turn connected by discrete hardwired line, as in the case of the called class-of-service multiplexer 342, to indicate the "calling class-of-service" of that address. Calling class-of-service refers to restrictions on calls originating from that address, e.g., a station may be prevented from initiating a call beyond a defined geographical area. Thus an output is produced on a line 352 to indicate the calling class-of-service associated with the equipment address designated by the line counter 316.

An off-hook multiplexer 346 is supplied with the output of the line counter 316 and gated off-hook outputs from each of the addresses 1 through *n*. The off-hook multiplexer 346 matches the address supplied from the line counter 316 with the appropriate gated off-hook signal (which may or may not be present) and produces an output on line 348 to indicate whether that particular address is off-hook.

Figure 6:
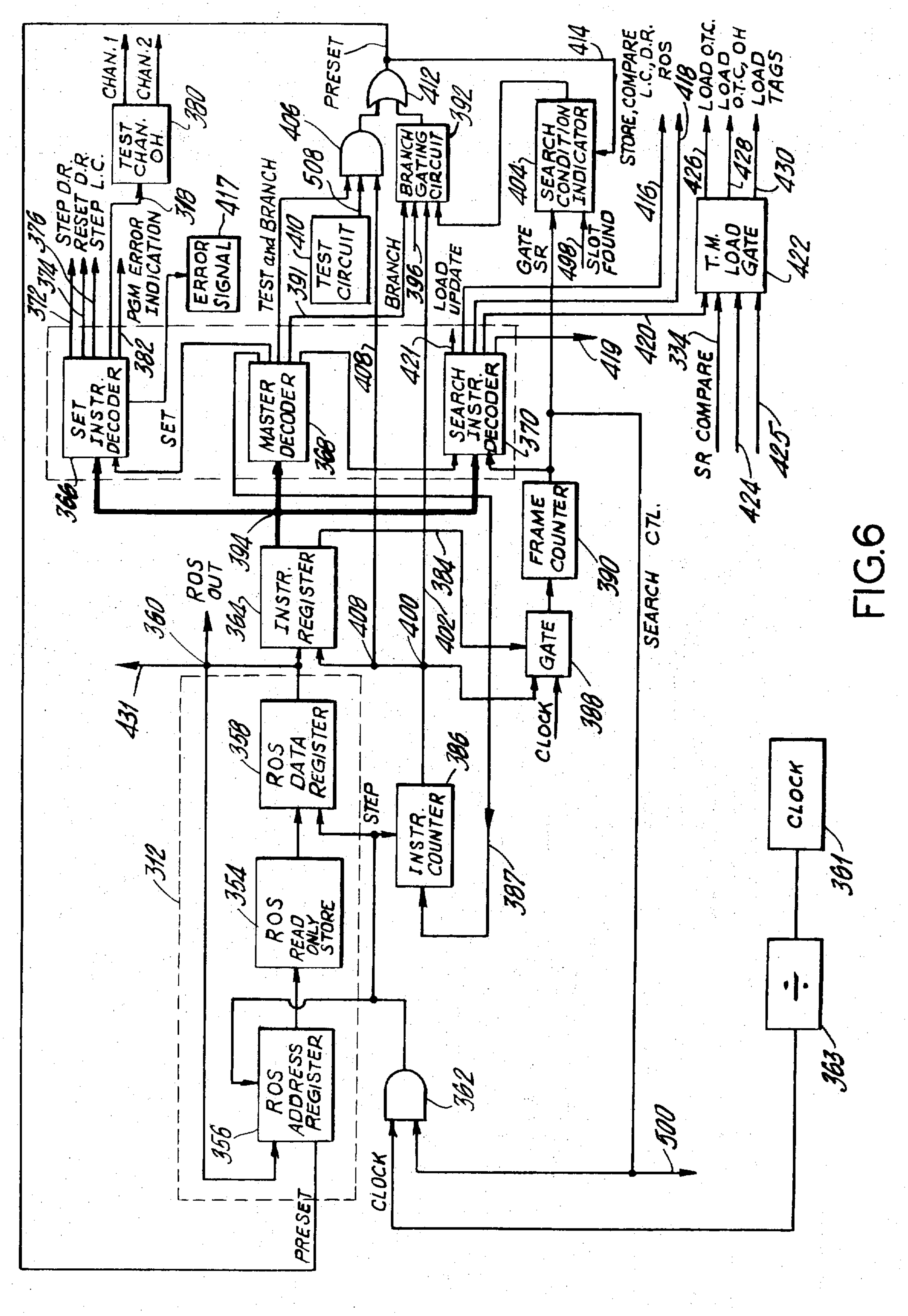
FIG. 6 shows additional control circuitry of the system.

FIG. 6 shows control circuitry connected to the data flow circuitry of FIG. 5. The permanent memory 312 of FIG. 5 is shown there in greater detail. It includes a read-only store (ROS) 354, which is a metal oxide semiconductor memory device in which instructions of variable word length are permanently stored in a predetermined sequence. These instructions are read out of the ROS 354 as an input to a data register 358 in response to inputs to the ROS 354 from a ROS address register 356. Part of the output of the data register 358 is supplied to the AND gate 310 of FIG. 5 by a line 360. A read-out of information from the ROS 354 is initiated by a clock pulse from a clock 361 passed by an AND gate 362 which steps the ROS address register 356 to the next sequential instruction word. The clock 361 is a crystal oscillator, the output of which is passed through a series of frequency dividers 363. The clock 361 is common to the time division switch and the ROS address register 358. When the AND gate 362 is constantly enabled, the address register 358 and the time division switch are operated in synchronization at the same frequency.

Each operating instruction permanently recorded in the ROS 354 consists of one or more words in uninterrupted sequence. All the words forming a single instruction are accumulated in an instruction register 364 as they are read out of the ROS data register 358 which functions as a buffer means. A complete instruction is thus accumulated in the instruction register 364 and, as accumulated, is presently to the three instruction decoders 366, 368 and 370. These instructions are delivered by bundles of discrete lines. Each decoder 366, 368 and 370 is responsive to particular combinations of these discrete bit carrying lines.

The decoder 368 is called the master decoder. It acts on the first word of each instruction presented by the instruction register 364 which indicates the number of words to follow in that instruction and gates the instruction counter 386 via a line 387 for the appropriate number of words. Execution of the instruction is delayed until the complete instruction has been accumulated, as determined by the counter 386.

Upon receiving a one-word instruction, the master decoder 368 enables the set instruction decoder 366. Upon receiving a selected two-word instruction, the master decoder 368 enables the search instruction decoder 370. A search instruction is always coincident with an instruction delivered by a line 384 to a gate 388. The gate 388, upon receiving an output from the line 384 as well as an output from the instruction counter 386, triggers a search frame counter 390 which inhibits the operation of the primary memory 312 by disabling the AND gate 362 to block the passage of clock pulses for a count equal to the number of time slots used in the system, in the exemplary embodiment 32. This enables the search to be completed before the next instruction is read out of the ROS 354. The frame counter 390 also enables the search instruction decoder 370 so that the search continues for one complete frame and supplies an input to the search condition indicator 404.

Other instructions from the decoder 368, those communicated via a line 391, are used to set a branch gating circuit 392. This gate is set when the next instruction to be read from the ROS 354 is at a designated address indicated by the output of the instruction register 364 taken from the junction 394 and supplied by a line 396 to the gating circuit 392 (complete connection not shown). The designated address is then accessed by the register 356 regardless of its sequential position in the ROS 354. Another input to the gating circuit 392 is taken from the instruction counter 386 via a terminal 400. An input via a line 402 to the gating circuit 392 indicates the number of words in the instruction. The last input to the gating circuit 392 is from a search condition indicator 404 which indicates whether the condition or conditions called for by the search instruction decoder 370 have been found in the temporary memory. Not all branch instructions require the coincident presence of all four inputs to the gating circuit 392. All branch instructions do reset the indicator 404 via a line 414.

Another type of output of the master decoder 368 is supplied to an AND gate 406. This output is called a test and branch instruction and is used to test for predetermined information and access an appropriate ROS 354 instruction out of sequence. This operation is explained in greater detail below in reference to FIG. 8.

A second input to the AND gate 406 is supplied by a line 408 and taken from the instruction counter 386 via the junction 400 to indicate the number of words in the instruction. The third and last input to the AND gate 406 is provided by a test circuit 410 which is also shown in greater detail in FIG. 8 and explained below. The output of the AND gate 406 and the branch gate 392 are supplied to an OR gate 412 to provide an output which indicates that the ROS address register 356 is to branch. Part of the output of the OR gate 412 is supplied via the line 414 to reset the search condition indicator 404.

The set decoder 366, in response to a coincident input from the master decoder 368, processes one word instructions from the instruction register 364 that cause equipment within the system to be set or incremented to the next sequential position. For instance, an output on line 372 advances the dial register 304 to the next binary state. An output on line 374 resets the frequency converter 300 to a cleared state. Another line 376 increments the line counter 316 to the next sequential position. An increment instruction is communicated by a line 378 to a test channel latch set mechanism 380 to provide off-hook signals with respect to two predetermined equipment addresses reserved for test purposes. These off-hook signals are in turn supplied to the off-hook multiplexer 346 of FIG. 5. A line 382 carries an output of the decoder 366 which indicates that a previously executed test (via the line 378) has uncovered a system error, thus ultimately activating a malfunction indicator 417 which may be a light emitting diode.

The search instruction decoder 370, also responsive to the master decoder 368, has five outputs. The first, via a line 416, enables the AND gates 308, 310 and 314 to store information relating to the dial register 304, the ROS 354 and the line counter 316, respectively. The second output of the decoder 370 is supplied via a line 418 to enable AND gates 322, 324 and 326 to compare information relating to the ROS 354, the line counter 316 and the dial register 304, respectively. The third output from the decoder 370 is supplied by a line 419 to the circuit of FIG. 9 to indicate that a free time slot is desired. The fourth output from the decoder 370 is supplied by a line 420 to a gating circuit 422 which controls loading of the temporary memory (FIG. 10). The fifth is supplied by a line 421 to control updating of the tag and off-hook portion of the temporary memory.

Other inputs to the gate 422 are supplied by a line 334 from the comparator 330 shown in FIG. 5, a line 424 which supplies information relating to the off-hook condition of equipment addresses recorded in the temporary memory, and a line 425 which indicates the arrival of the desired time slot. These inputs are derived from the circuits shown in FIGS. 7 and 9. The first output of the loading gating circuit 422 is supplied by a line 426 to control loading of the address portion 320 of the temporary memory. The gate 422 has two additional outputs supplied by lines 428 and 430 to gate loading of the off-hook and tag shift registers 428 and 440 of the temporary memory. The inputs to the temporary memory thus gated are supplied directly from the ROS 354 by a line 431 (FIG. 6).

Figure 7:
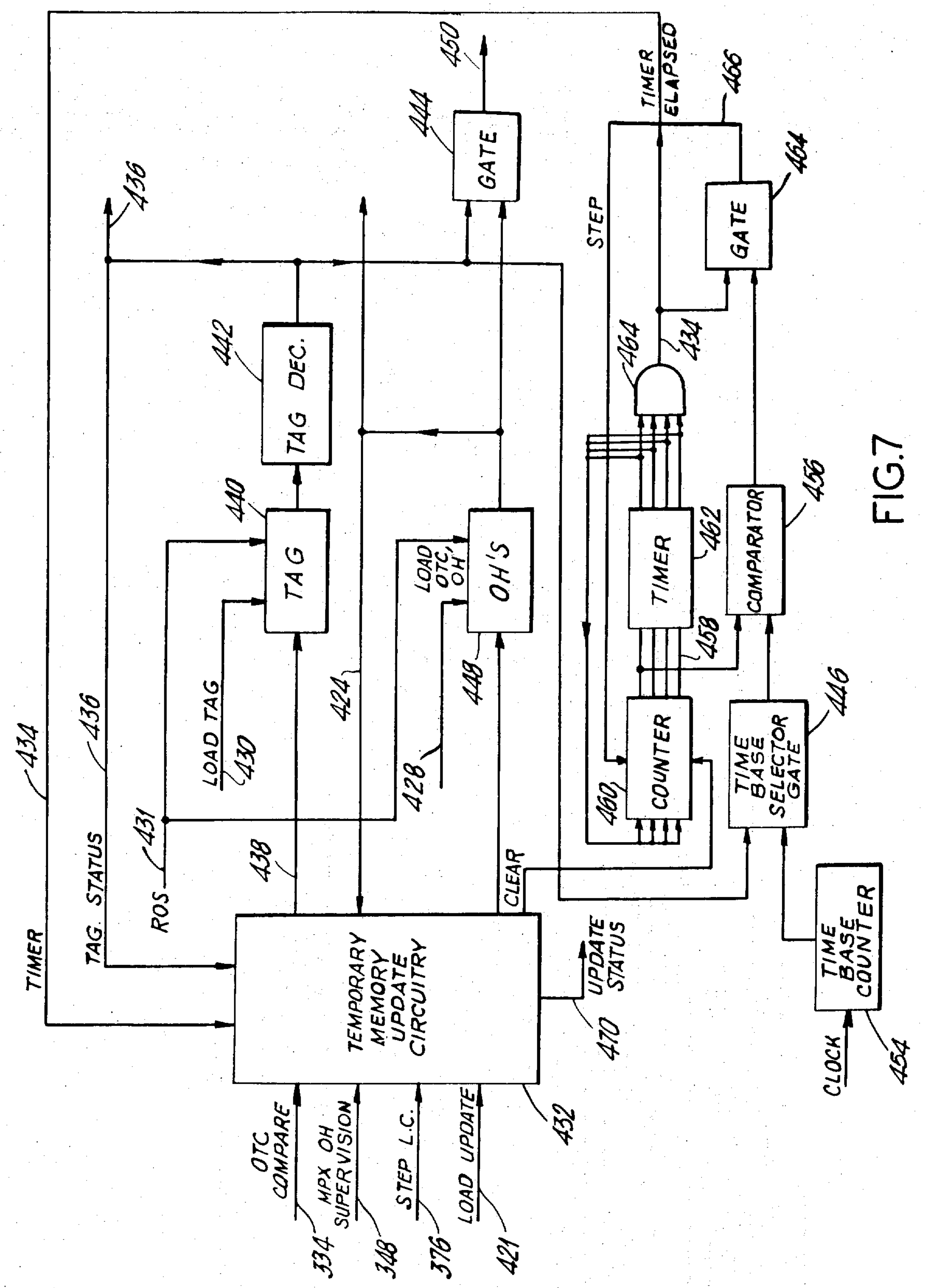
FIG. 7 shows the update circuitry and timer of the system.

FIG. 7 shows a temporary memory update circuit 432, the function of which is to update information in the shift registers of the temporary memory in accordance with various inputs. One such input is supplied by a line 348 from FIG. 5 and indicates that an equipment address has gone off-hook. The line 376 carries an output of the decoder 366 which indicates that the updating relating to a particular time slot is completed and clears the update circuitry 432 so that the update operations relating to other addresses can be performed. The line 421 gates the update circuitry 432 so that it is activated only when called for by an instruction decoded by the search instruction decoder 370.

A line 434 carries information relating to a timer 462 which may call for a change in the contents in the temporary memory. Another input, which is an enabling input that must be coincident with one of the above inputs before action is taken, is supplied by a line 334 from the comparator 330 shown in FIG. 5. This indicates whether the information received by the circuit 432 from one of the other input lines is already present in the temporary memory. Another line 436 supplies to the update circuit 432 the tag status of the various time slots. An additional input to the update circuit 432 is supplied from a line 424 and relates to the on-hook and off-hook status of each address stored in the temporary memory.

If a change in the tag status of a time slot recorded in the temporary memory is to be indicated, that information is communicated from the update circuit 432 by a line 438 to a group of recirculating tag shift registers 440 forming part of the temporary memory.

The contents of the tag shift register decoder 442 is supplied to a comparator gate 444 and to a time base select gate 446. Another output of the update circuitry 432 is supplied to another portion of the temporary memory comprising a group of shift registers 448 in which the off-hook status of each address in the temporary memory is recorded. This group of off-hook shift registers 448 also includes in each register one bit pertaining to each time slot. The output of the off-hook shift registers 448 is also supplied to the gate 444 and to the line 424 for feedback to the update circuitry 432. The gate 444 provides as an output the address supplied by a line 450 to an address decoder 335 shown in FIG. 5.

The time base select gate 446 which receives an output from a time base counter 454 provides one of two inputs to a comparator 456 indicating the lapse of time permitted in association with the indicated tag status of the time slot. The comparator 456 receives a second input from the line 458 which is in turn derived from a loop including a counter 460 and a group of timer shift registers 462 in the temporary memory. A predetermined binary number in the shift registers 462 of the time indicates an elapsed time interval causing an indication thereof on line 434. The elapsed time indication from the line 434 is input to a gate 464 and, together with the output of the comparator 456, steps on the counter 460 in relation to the particular time slot via a line 466. The counter 460 is cleared by the update circuitry 432. The operation of the timer 462 to time intervals of differing lengths with respect to different time slots is explained more fully below.

Another output of the update circuitry 432 is the update status information supplied by a line 470 to the circuit of FIG. 8 and is explained below.

Figure 9:
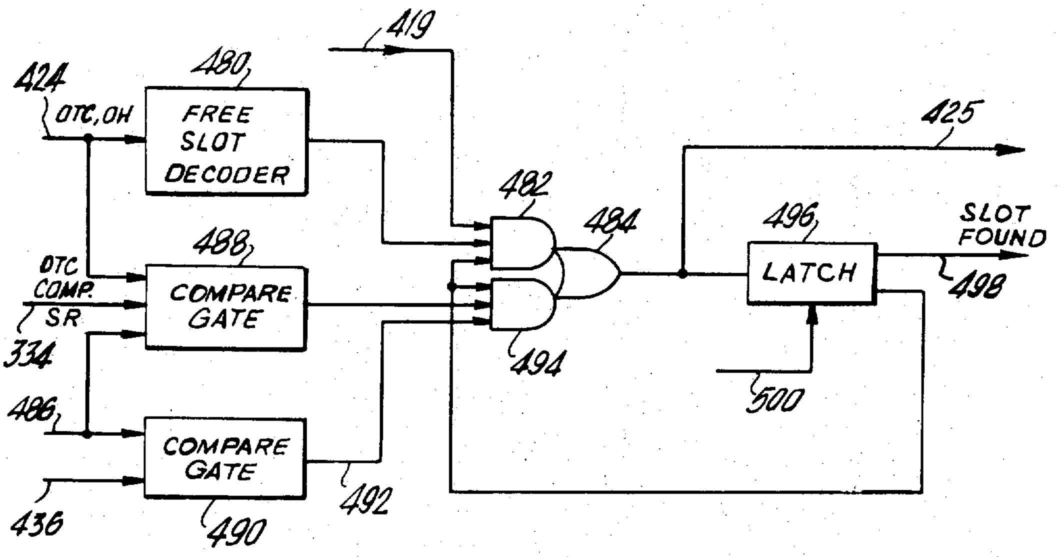
FIG. 9 shows the temporary memory loading control circuitry of the system.

FIG. 9 shows the circuitry which controls loading of the temporary memory. Information from the shift registers 448 relating to off-hook status is fed via a line 424 to a free slot decoder 480. This decoder 480 produces an output to an AND gate 482 if its input indicates the absence of an off-hook condition in each of the addresses assigned to any particular time slot. The second input to the AND gate 482 is applied by a line 419 from the search instruction decoder 370 of FIG. 6. The AND gate 482 thus produces an output to an OR gate 484 if a free time slot is available and desired.

The output of the instruction register 364 taken from the junction 394 is applied by a line 486 to two comparators 488 and 490. The decoded output of the tag shift registers 440 produced by the tag decoder 442 is supplied via the line 436, as the second input to a comparator 490. The comparator 490 produces an output if the condition of a time slot indicated by the temporary memory coincides with that called for by the operative instruction. This output is supplied by a line 492 to an AND gate 494. The comparator 488 produces an output to the AND gate 494 in response to an input from the line 334 indicating that the address desired has been located in a particular time slot if the off-hook bit associated with that address compares to the off-hook bit searched for as indicated by the line 486. If the address, off-hook and tag portions of a time slot all compare, as indicated by the decoder 480 and the comparator gates 488 and 490, the AND gates 482 and 494 are thus enabled. The AND gates 482 and 494 then cause the OR gate 484 to produce an output on the line 425 to loading gate 422 (FIG. 6) which causes new information to be loaded into the time slot of the temporary memory which has been identified. The output of the OR gate 484 is also supplied to a latch 496 which disables the OR gate 484, so that only one time slot will be loaded. Another latch output is supplied by line 498 to the search condition indicator 404 of FIG. 6. The latch 496 is cleared by an input 500 from the search frame counter 390 at the end of a count cycle. A similar input simultaneously may set the search indicator 404 in accordance with the status of the latch 496.

Figure 8:
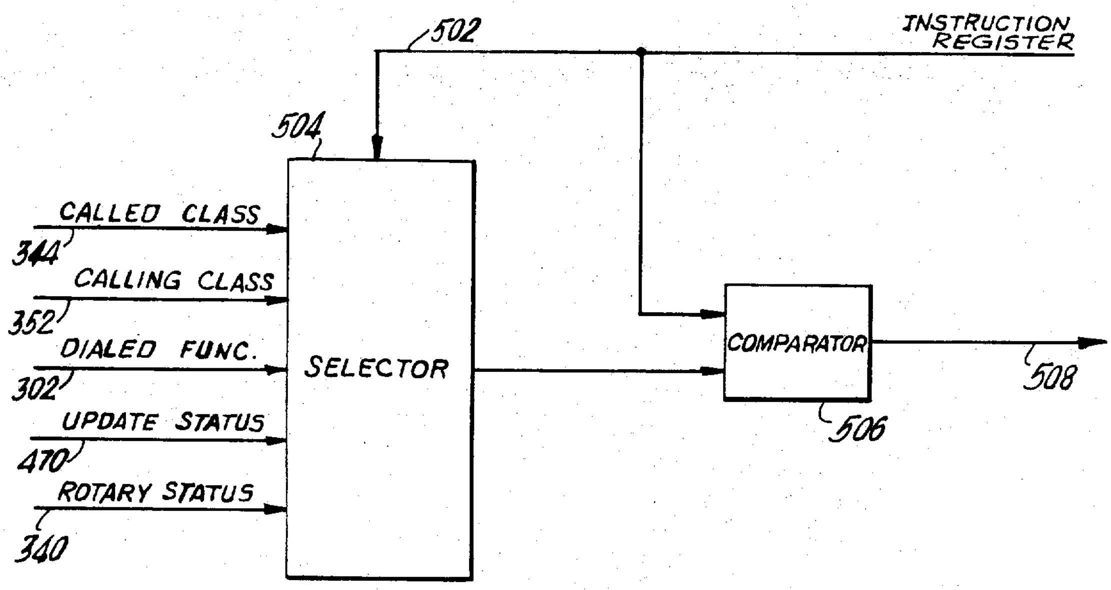
FIG. 8 shows, in greater detail, the test circuit of FIG. 6.

FIG. 8 shows in greater detail the test circuit 410 of FIG. 6, together with its inputs. The output of the instruction register 364 taken from the junction 394 is supplied by a line 502 to a selector 504. The function of this selector 504 is to supply to a downstream comparator 506 selected information called for by the instruction register. The selected information may be the called-class-of-service supplied by the line 344, the calling class of service supplied by the line 352, the dialed function code from the touch-tone frequency converter 300 via the line 302, the update status from the line 470, or the rotary status from the line 340. (All these inputs, except the penultimate which comes from FIG. 6, come from FIG. 5.) The selected data from the selector 504 is then compared by the comparator 506 and, in accordance with whether a positive comparison is obtained, an output is produced on a line 508 and supplied to the AND gate 406 shown in FIG. 6.

The Temporary Memory

Figure 10:
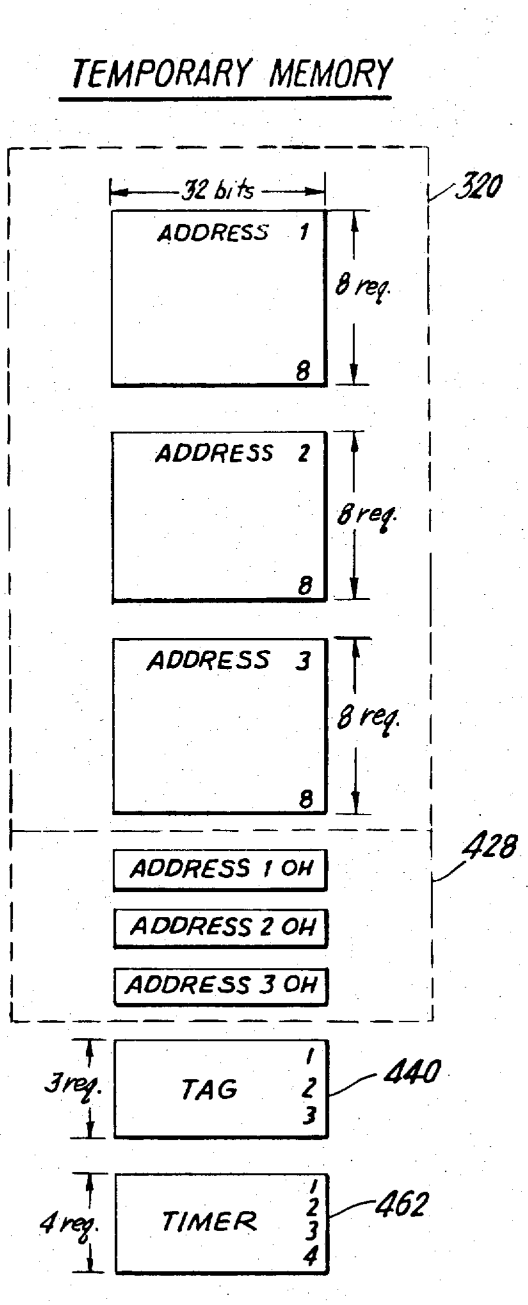
FIG. 10 shows the temporary memory of the system.

The various portions of the temporary memory that are included in FIGS. 5 and 7 are collected in FIG. 10 for purposes of further explanation. It comprises a plurality of equal length, synchronized, shift registers constantly recirculating at a frequency derived from the clock 361. Each shift register has a number of bit positions or storage elements equal to the number of recurring time slots, in this exemplary system 32. Since the shift register contents recirculates, information relating to an individual time slot constantly moves from one set of shift register storage elements to the next. Thus no particular bit position in the temporary memory can be dedicated to a particular time slot.

FIG. 10 shows a temporary memory including 34 shift registers. Thus a set of 34 storage elements, one from each shift register, relates instantaneously to a particular time slot as the contents of the temporary memory circulates. The address memory portion 320 of the temporary memory includes 24 of these shift registers to form first, second and third address field of 8 registers each. A three decimal digit octal equipment address can be included in binary form in each shift register (not all numbers from 1 to 999 being used). Thus, three pieces of equipment, e.g., three stations, can be interconnected through a single time slot to permit, for example, conference calls.

Also included in the temporary memory are the shift registers of the off-hook memory 428. One of these off-hook shift registers is dedicated to each of the address fields and indicates by a single binary bit the on or off hook condition of the equipment address there designated.

Another portion of the temporary memory is the tag code memory 462 which, in this system, includes three shift registers to indicate by three binary bits the status of the connection in each time slot.

Tag codes might thus indicate ringing, active connection between two or more parties, not connected (all parties but one have hung up), or call on hold. The tag code might also indicate a predetermined time interval to be measured by the timer 462, such as the time allowed a station to complete dialing once connected to the dial register 304.

The remaining four shift registers of the temporary memory form the timer 462 in which the contents is a four bit binary number that is periodically incremented until a number that indicates time elapsed is reached, as explained in further detail below

The Permanent Memory and Instruction Handling

The program of the system, permanently recorded in the MOS ROS 354, is composed of variable-word-length instructions. In an exemplary arrangement, these instructions may have one, two or three words, a word being defined as the information read out of the ROS 354 during one access cycle.

The instructions may be divided into two categories. One category is immediately executed following instruction readouts by the ROS address register 356. The second category requires searching the temporary memory (FIG. 10) for specified information before execution can be completed. Thus the operation cannot proceed to the next step until an entire frame of time slots has been interrogated.

The basic instruction flow from the ROS 354 is controlled by the ROS address register 356, the ROS data register 358, the instruction register 364, the instruction counter 386 and the master decoder 368.

Each word recorded in the ROS 354 has a ROS address. When this ROS address is presented by the ROS address register 356, the output of the ROS 354 will denote the contents of that particular word location. The ROS address register 356 is stepped consecutively in a binary fashion from one address to the next under the timing control of the clock 361 unless a search type instruction is read out of the ROS 354 in which case stepping is blocked by disabling the ROS address register 356 until a frame has been counted by the frame count means 390. Another exception to consecutive stepping of the address register 356 occurs in response to a branch instruction which calls for reading out a specific predetermined recorded instruction regardless of its sequential position.

When the address register 356 is stepped to an address, the contents of that address is loaded into the ROS data register 358 and immediately transferred to the first of three word positions in the instruction register 364. The master decoder 368 monitors the first word presented by the instruction register 364 to determine from its contents whether the instruction contains 1, 2 or 3 words. If it is a one word instruction, it is immediately executed, the instruction counter 386 does not advance, and the clock 361 steps the ROS address register 356 to the next sequential position which causes a new word to be loaded into the first position of the instruction register 364. The word is then interrogated to see whether it is a 1, 2 or 3 word instruction, and if it is a two word instruction, the instruction counter 386 steps at the next clock pulse from the source 362 to a second position, which will cause the next sequential word to be read out of the ROS 354, but this time the word will be loaded into the second position of the instruction register 364. This instruction will then be executed. The following output of the source 362 will bring the instruction counter 386 back to its first position, and the next word read out of the ROS 354 will be loaded into the first word position of the instruction register 364.

If a 3 word instruction is read from the ROS 354 the next output pulse of the source 362 will step the instruction counter 386 after the first word has been read and the second word will be loaded into the second position of the instruction register 364. Another clock pulse will follow stepping the instruction counter 386 to its third position and the third word read out of the ROS 354 will be loaded into the third instruction register position and the instruction will be executed. The third position of the instruction register is actually a flow-through position in that the data input to the register 358 is used directly, as indicated by the line 360 in FIG. 6.

As long as the master decoder 368 has not determined that the instruction read out of the ROS 354 calls for branching to a predetermined ROS address, the ROS address register 356 will continue to increment through successive binary addresses, reading the contents of the ROS in order.

When a branch instruction is executed, an output of the master decoder 368 may result in an output of the OR gate 412 which enables the contents of the ROS data register 358 to be loaded into the ROS address register 356 at the occurrence of the next clock pulse passed by the AND gate 362. This results in a predetermined address of the ROS 354 being accessed regardless of its sequential position. Branch instructions are used to access subroutines of the program called for by specific conditions discovered within the system.

The Establishment and Disestablishment of Connections

Each piece of equipment within the system that may be connected to other such pieces of equipment through a common time slot is permanently assigned an equipment address. These pieces of equipment include stations, trunks, dial registers, error tone sources, busy tone sources, etc. Equipment addresses should not be confused with ROS addresses that are associated with recorded instructions rather than pieces of equipment.

The supervision and control circuitry described above establishes and disestablishes connections in accordance with information electronically available within the system. The primary information relating to the current use of time slots that have been assigned is contained in the temporary memory (FIG. 10). Other information relating to equipment addresses, regardless of whether they are involved in a connection, is made available by hardware discretely assigned to specific equipment addresses. This hardware presents signals or indications generated by the multiplexer 338, 342, 346, and 350 to provide rotary status, class-of-service and off-hook information, each multiplexer having a discrete hardware line for each equipment address that can be connected to a common output line. Supplemental information available from hardware outside the temporary memory is the contents of the dial register 304. Some additional information is available directly from the frequency converter 300. Further information is available from latches set within the update circuit 432.

When the line counter 316 is stepped to a new equipment address, all common information stored with respect to other equipment addresses is cleared from the common control circuitry in preparation for processing the information associated with this new equipment address. The update circuit 432 (FIG. 7) then allows the temporary memory contents to be modified if required and indicates any subroutine of the ROS program instructions that must be executed as a result of status changes associated with that equipment address.

First the time slot, if any, that contains information relating to the equipment address designated by the line counter 316 is located by comparing each address portion of the temporary memory to the line counter contents. A modification of the memory time slot contents occurs after this contents has been compared to the more current information available from the discrete circuit elements associated with the equipment address. This comparison is made by the update circuitry 432 as explained above with reference to FIG. 7. These same comparisons are used to set latches in the update circuitry 432 which indicate via the line 470 information used to determine by ROS instructions whether the ROS address register 356 should branch to an appropriate subroutine. Accordingly, the sequence of operations is to step the line counter 316 to determine what information in the temporary memory must be changed and what further program steps must be followed. After the execution of these instructions, the line counter 316 is stepped to the next sequential equipment address.

The line counter 316 is always stepped at a very high speed compared to the rate at which changes occur in the use of the system. If no changes occur in an exemplary system the line counter 316 is stepped every 120 microseconds. If a subroutine is executed, the delay might typically equal about 0.5 milliseconds. Accordingly, the control circuitry never dwells on a particular connection for a time which is significant from the point of view of a human user. In effect, the control circuitry handles a multiplicity of stations on a time sharing basis.

For purposes of explanation, it is assumed that the line counter 316 has stepped to an address associated with a station that has gone off hook since the last time the line counter 316 stopped at this equipment address. The update circuitry 432 (FIG. 7) is activated. All information pertaining to the address is gated to the common controls, including any partially or completely dialed information stored in the dial register 304 and associated with a previous connection involving that equipment address. An off-hook signal appears on line 348 (FIG. 5), but a search of the temporary memory will show that the selected line counter address is not involved in an existing connection. That is a call request condition and a signal is produced on the line 470.

It is assumed that the off-hook station desires connection to the dial register 304. The call request test instructions recorded in the ROS 354 activate a subroutine to determine by searching the temporary memory where there is a free-time slot and whether the dial register 304 is available. Assuming both are available, the ROS instructions will cause the selected line counter address to be loaded into the address portion of the temporary memory in the first address field of the free time slot and store the address of the dial register 304 in the second address field of the same time slot.

The loading of the selected line counter address via the gate 314 in a free time slot is accomplished with a search instruction processed by the search instruction decoder 370. The loading of the dial register address requires that the time slot in which the line counter address has been loaded be found a second time. This requires a second search instruction whereby the selected line counter address is compared with the address portion of the temporary memory. Associated off-hook bit and tag codes are verified. Said second instruction then causes the dial register address, which is supplied by the ROS 354, to be loaded into the second address field of the time slot via the gate 310. A similar comparison is executed to identify the operative slot to be modified by further instructions as part of additional steps to follow.

Once the connection between the station and the dial register 304 is established by entering two address in a common time slot of the temporary memory, the line counter 316 is stepped to the next sequential equipment address to service other stations and make necessary changes concerning other connections.

Having two addresses in the temporary memory in the same time slot creates an audio connection between them because the associated gates 200 and 280 are enabled simultaneously by the time division switch. Thus the presence of the dial register address in the temporary memory not only gates an audio signal from the station to the touch-tone frequency converter 300, but also gates a dial-tone generator to the station. Thus, while the line counter 316 continues to step through the equipment addresses searching for conditions that require an update, the station user at the address under discussion can key in information through his touch tone pad 34, which will indicate the specific connection desired. This information may be, for example, a sequence of three decimal digits identifying an address within the system to which he desires a connection. These digits are successively stored in the frequency converter 300. The touch tone frequency converter 300 includes a register which stores the dialed digits as well as a counter that determines how many of these dialed digits have been presented by the pad 34. The converter 300 also includes a register for a dialed function and a sensor which indicates whether a complete number has been dialed.

If a busy condition is found upon searching the temporary memory, the ROS instructions will cause the address of a busy tone generator to be inserted in the second address field 320 of the temporary memory via the gate 310 in place of the address of the frequency converter 300. Thus a busy tone will be supplied to the station through an audio path established by the time division switch. The removal of the converter address makes this equipment available to other stations.

If the dialed equipment address is not busy, it will instead be loaded into the address memory 320 in place of the frequency converter 300 address and a ring tag will be loaded into the tag memory 440. The line counter 316 will then advance to another equipment address. Meanwhile, having two addresses associated with one time slot in the temporary memory, only one of these addresses being off-hook, and having a tag code indicating ringing, will cause the address that is not off-hook to be rung. This condition will persist until the calling address goes on hook or the called address goes off hook. In the latter case, when the line counter 316 steps to the called address the update circuitry 432 will enter an off-hook bit associated with the called address and a connection tag code in the appropriate time slot of the temporary memory portion 448 and 440. So long as this connection remains unchanging, the update circuitry 432 will not modify the temporary memory or activate any subroutines when the line counter 316 periodically passes over the two addresses involved. When one of the stations goes on-hook and is recognized by the line counter 316, an on-hook indication will be presented by the multiplexer 348, and the off-hook bit associated with that address will be reset in the temporary memory while the connection status tag code is changed by the update circuitry 432.

When one station involved in a connection goes on hook, the address of that station is not removed from the temporary memory, although the tag code and the off-hook bit are changed. Thus the temporary memory continues to indicate a busy condition for the station that has not gone on hook and provides information for a connection on hold, as explained below. When the second station goes on hook, the time slot is cleared and made available for other uses.

A connection is placed on hold by activating the hold-flash generator 40 (FIG. 1) at one of the stations involved. This interrupts the current flow through the lines 20 and 22, resulting in an on-hook signal on the line 348 (FIG. 5). When the on-hook signal is first detected by the update circuitry 432 upon scanning of the equipment address involved by the line converter 316, it must be determined whether the signal indicates the complete termination of a call by one station or whether the signal is a hold signal. Accordingly, the new tag inserted in the temporary memory is a timer tag. The timer 462 then times an interval of appropriate duration as indicated by the tag. The operation of the timer 462 is explained below.

The on-hook signal generated by the hold-flash generator 40 is of a predetermined duration less than the interval measured by the timer 462. Both the timer signal (line 434) and the on-hook signal are tested each time the line counter 316 scans the equipment address in question. If a time elapsed signal from the elapsed time gate 464 appears before the on-hook signal terminates, then there is a true hang up condition. Otherwise the connection is placed on hold. The disconnect timer 43 in the station insures that a true hang up condition of short duration will not simulate an output of the generator 40.

Whenever an equipment address is called, not only is a busy check performed, but the called-class-of-service associated with the dialed number and the calling-class-of-service associated with the line counter address are cross checked to determine whether the originating station can be connected to the number dialed. For example, if a station has a calling-class-of-service that restricts it from making outside calls and the called-class-of-service associated with the dialed number indicates that this is an outside line (trunk), these two pices of information indicate by the activated ROS subroutine that the desired connection cannot be made. Accordingly, the originating station will be connected to an error tone generator.

Calling-class-of-service signals are generated by the multiplexer 350, and called-class-of-service signals are generated by the multiplexer 342. The rotary status signal, generated by multiplexer 338 and presented on line 340, is checked in the event that the dialed number is busy. A rotary status indication means that if the number that has been dialed is busy the dial register 304 (FIG. 5) should be stepped to the next sequential binary number that could have been dialed to test whether that number is also busy. If it is not, the connection will be made to that next number. If that number is busy as well, the rotary status indication associated with the new number is tested. A busy signal will be returned only if a busy address is reached which does not have a rotary status signal from the multiplexer 338 associated with it.

Function Codes

Some of the signals generated by the touch tone pad 34 are not used to begin equipment address. These signals are reserved for calling for unique operations which the flexibility of the system hardware permits. These signals are translated into function codes and stored in the function registers by the frequency converter 300. They are presented by the line 302 to the test circuit 410 (FIG. 8) when the originating address is scanned by the line counter 316

One function code used in this exemplary system is called "reconnect." It is used to re-establish a connection in which the other address has been placed on hold and can be sent by a station whenever it is connected through a common time slot to the dial register 304. ROS instructions activated by the connection between the scanned equipment address and the dial register 304 test for the various function codes and cause the address register 356 to branch to the appropriate subroutine. The instructions of the reconnect subroutine cause the temporary memory address fields to be searched for the equipment address with an appropriate associated off-hook bit and tag code. This identifies the desired time slot. Then the tag and off-hook information is modified to re-establish the connection, the appropriate address already being present in the time slot. This is accomplished via an instruction that causes the temporary memory load gate 422 to provide signals on lines 428 and 430, thereby loading data supplied from the ROS 354 by the line 431.

Another function code is called "add-on." It allows a station user to add an equipment address to a connection as a third party. This is done by first putting the call on hold. When the dial tone returns, the add-on code is dial followed by the address of the third party. A A program subroutine accessed by the add-on code causes the third party address to be entered into the third address field of the temporary memory. The reconnect steps are then automatically executed so that three equipment addresses are connected through the common time slot.

A further function code is called "transfer." This is a process by which a call is placed on hold and then the transferring station user causes an equipment address which he dialed in following the function code to be substituted for his own in the temporary memory. At the same time, the tag code is changed to cause ringing of the transferee address.

Another exemplary function code is called "pick up." This allows a station user to answer a call ringing at another station. Following the function code, he dials in the address of the ringing station. This causes the address of the station picking up to be substituted in the temporary memory for the address being rung.

Operation of the Timer

The timer 462 comprises a group of temporary memory recirculating shift registers. Thus each set of temporary memory storage elements contains a timer portion capable of storing a binary member. This number, which may be referred to as a timer number, circulates with the rest of the temporary memory contents from one set of storage elements to the next. Once during each recirculation, each such binary timer number passes through the counter 460 where it may be incremented to the next successive number. When the timer number reaches a predetermined magnitude, it thereby indicates that a measured time period has elapsed.

The timer 462 may be used to measure a time interval for each temporary memory time slot. These time intervals need not commence simultaneously, because action is taken with respect to a connection only when the binary number carried in that slot reaches the predetermined magnitude.

The time base counter 454 and the time base select gate 446 enable the timer 462 to count intervals of various lengths simultaneously. For example, it may be desired to time calls placed on hold and cause the holding station to ring after a first predetermined interval, as explained above. A second predetermined interval of a different length might represent the time for which a particular station may remain connected to the dial register 304 so that the register 304 is not inactivated if dialing remains incomplete. In view of the flexibility of the system, a wide variety of purposes, some uniquely applicable to the needs of a particular user, could be programmed into the system and each interval could have a different length.

So that intervals of different lengths can be measured, the time base counter 454 generates a plurality of varying polarity time base square waves each having a different pulse rate. Each pulse rate is derived from the output of the clock 361 by a series of frequency dividers and multipliers. As the contents of a time slot is read out of the timer 462, the low order bit of this timer number is compared to the phase of the time base signal selected by the selector 446 for association with that time slot. If the phase of the time base signal does not correspond to the low order bit, an output of the comparator 456 on the line 466 then increments the counter 460 to the next binary number. If there is phase correspondence, the counter 460 is not incremented. Accordingly, the binary contents of a slot is increased at the phase change rate of the selected time base signal. The desired time base signal is indicated by the tag code associated with each time slot.

In an exemplary embodiment, the timer 462 includes four shift registers and thus measures 15 time base phase changes for each measured interval.

The intervals measured will vary slightly in length depending upon the random position of the appropriate time base signal at the time the measurement of the signal begins. In the exemplary embodiment which measures 15 pulses, the accuracy is within about 8%. Of course, this accuracy could be increased by including additional shift registers in the timer 462 to count more pulses of shorter duration.

When the timer number reaches the predetermined magnitude, the time elapsed gate 464 produces an indication thereof on the line 434.

It will be obvious to those skilled in the art that the above-described embodiment is meant to be merely exemplary and that it is susceptible of modification and variation without departing from the spirit and scope of the invention. Therefore, the invention is not deemed to be limited except as defined by the appended claims.

What is claimed is:

1. A time division multiplex branch exchange for a telephony system comprising:

a multiplicity of sets of binary storage elements that form a recirculating temporary memory, each set forming an address portion and a timer portion;

means for loading the addresses assigned to equipment that may be interconnected through a common time slot into the address portions of each set of storage elements;

time division switch means responsive to said temporary memory for gating an audio connection between equipment assigned the addresses that appear simultaneously in one set of storage elements;

counter means for periodically incrementing the contents of each timer portion in sequence;

selector means for selecting a time base signal of varying polarity having a pulse rate corresponding to the condition of the connection associated with a particular time slot;

comparator means for comparing the output of the counter means with the polarity of the selected time base signal;

first gate means for causing the counter means to increase the corresponding recorded number each time the selected time base signal changes polarity; and second gate means for sensing when a recorded binary number contained in a timer portion has reached a predetermined magnitude and producing an output to indicate that a time interval has elapsed.

2. The apparatus of claim 1, wherein each set of storage elements also includes a tag portion for indicating the time base signal to be selected.

* * * * *